June 24, 1958      H. S. HEMSTREET      2,839,840
NIGHT LANDING SIMULATOR FOR TRAINING AIRCRAFT OPERATORS
Filed April 14, 1955      6 Sheets-Sheet 1

June 24, 1958   H. S. HEMSTREET   2,839,840
NIGHT LANDING SIMULATOR FOR TRAINING AIRCRAFT OPERATORS
Filed April 14, 1955   6 Sheets-Sheet 3

June 24, 1958  H. S. HEMSTREET  2,839,840
NIGHT LANDING SIMULATOR FOR TRAINING AIRCRAFT OPERATORS
Filed April 14, 1955  6 Sheets-Sheet 5

United States Patent Office 2,839,840
Patented June 24, 1958

2,839,840

NIGHT LANDING SIMULATOR FOR TRAINING AIRCRAFT OPERATORS

Harold S. Hemstreet, Binghamton, N. Y., assignor to Link Aviation, Inc., Binghamton, N. Y., a corporation of New York Application April 14, 1955, Serial No. 501,230

8 Claims. (Cl. 35—12)

This invention relates to improved method and means for producing visual simulation of night flight operations, and more particularly to the simulation of night landing and take-off maneuvers in a grounded flight trainer.

A realistic visual display for use with flight trainers and simulators has long been recognized as a very desirable training aid. The problem heretofore has been one of reproducing a full landscape and runway presentation within the confines of a stationary training device on the ground, with all the variations of visual aspect as may be viewed from an aircraft in actual flight. The problem is particularly difficult where it is desired to simulate the transition from air to ground, and vice-versa, for the purpose of training and practice in the execution of aircraft landing and take-off maneuvers.

The act of piloting an aircraft, and bringing it into a landing on a runway by the use of visual cues and information obtained by looking out through the windshield, involves complex and imperfectly understood problems in the psychology of vision and the accomplishment of visual-motor tasks. Because of these factors and because of the high speeds at which modern aircraft operate, the execution of landings and take-offs are among the more difficult and more hazardous aspects of aircraft operation. The hazard and difficulty are increased manyfold by night-time operations, and for this season there has long been a need for a training device capable of simulating night landing operations.

A method and apparatus for producing visual displays in grounded aircraft trainers are disclosed in copending application, Serial Number 457,514 of Harold S. Hemstreet and Robert A. Woodson, filed September 21, 1954, and assigned to the same assignee as the present application. The entire disclosure thereof is incorporated herein by reference thereto. The method therein disclosed may be defined as "compensated offset projection" in which optical images of an undistorted objective are projected onto an inclined screen, at an angle other than normal, by a projector located a substantial distance from the observer's viewpoint. Dimensional relationships of apparatus are there disclosed to effect accurate simulation of true perspective in projected images of terrain, as viewed by a trainee. Means are also disclosed for imparting relative motion to the projected images to simulate changes in aircraft heading, altitude, attitude, and lateral motions of flight. The means disclosed in that application permit projection from a film or color transparency which is an undistorted replica of a ground area.

While originally conceived for use in a helicopter trainer, the compensated offset projection system may also be adapted to simulation of night landing operations in fixed wing aircraft. The present invention, therefore, represents improvements and extensions of the system disclosed in the above identified prior application, particularly as adapted to the visual simulation of night landing operations.

It is an object of this invention to provide improved means for producing a visual illusion of flight in grounded flight simulation.

It is another object of the invention to provide improved means for visually simulating the maneuvers of landing and take-off in a grounded flight trainer.

A more particular object of the invention is to provide improved means for simulating night flight and landing operations in a grounded aviation training device.

Other objects and advantages of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
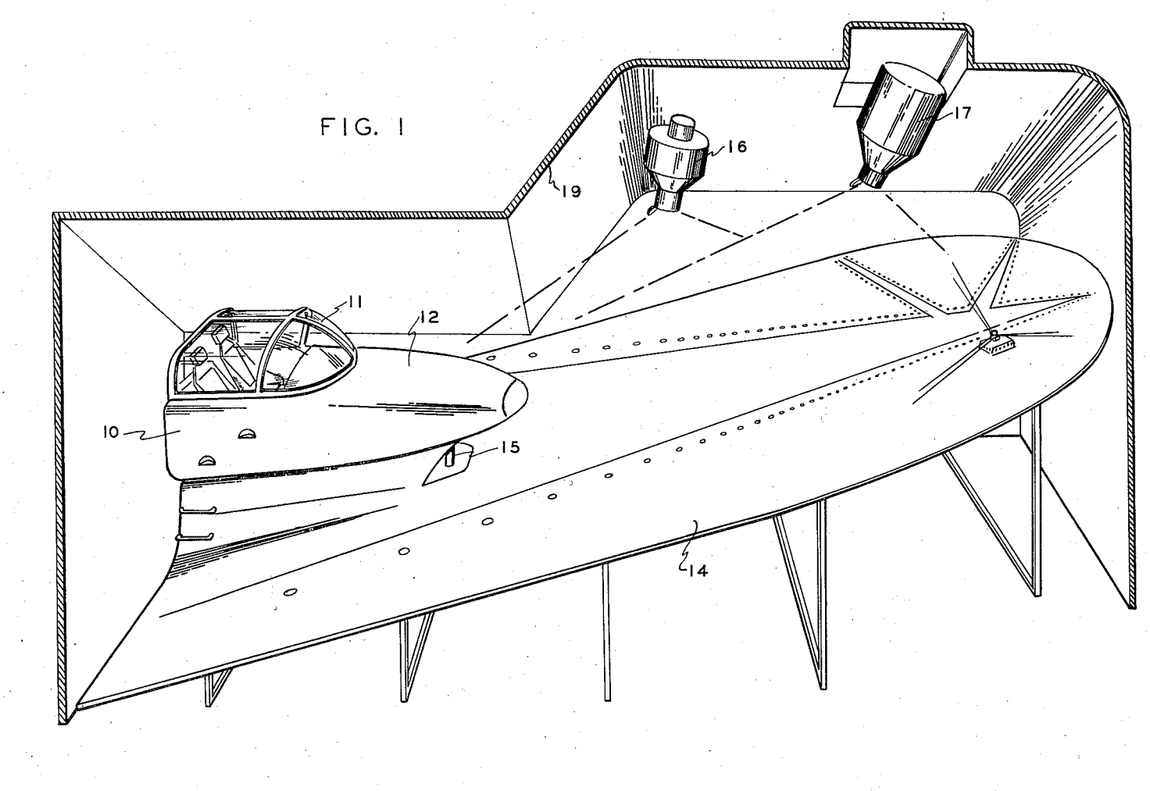
Fig. 1 represents a general perspective view of the apparatus of the invention, including an inclined projection screen, a simulated cockpit, and two offset optical projectors, one of which is adapted to project runway lights and the other images of terrain.

Referring first to Fig. 1 of the drawings, the apparatus of the invention comprises a simulated aircraft cockpit 10 with a transparent canopy 11 and a forwardly extending fuselage nose portion 12. The configuration of the cockpit and fuselage portion may exactly correspond to the appearance of any particular model or type of aircraft which it is desired to simulate. The cockpit and fuselage portion 10—12 are mounted in substantially fixed relation to an inclined projection screen 14, although the mounting may include flexible or movable supporting means as indicated generally at 15, for the purpose of simulating the motions of rough air or the accelerations and decelerations encountered in flight.

Normal roll and pitch motions may also be imparted to the cockpit and fuselage portions of the apparatus by the mounting means 15 or simulation of these motions may be introduced into the optical projectors and screen which are indicated generally at 16, 14 and 17 in Fig. 1. Projectors 16 and 17 are mounted on overhead beams or ceiling structure (not shown), and all of the apparatus of Fig. 1 is installed in a substantially light-proof enclosure or darkened room as indicated generally by the enclosure 19.

Projector 16 may substantially correspond to one of the projector embodiments disclosed in the aforesaid copending application of Hemstreet and Woodson. The structure of a preferred embodiment of projector 16 is disclosed in detail in Fig. 6 of the present application and will be described hereinafter. Projectors 16 and 17 are both operated, in combination with inclined projection screen 14, according to the principles and method of compensated offset projection as fully described in the aforesaid copending application. Projector 16 is employed in the present invention to produce a visual simulation of the runway surface and of the airfield terrain adjacent to the runway.

Projector 17, which is of unique construction as disclosed in detail by Fig. 3, Fig. 4, Fig. 5 and Fig. 7 of the drawings to be described hereinafter, operates in the present invention to project images of runway lights. Projector 17 contains a series of small high intensity light sources spaced relative to each other in a uniform pattern corresponding to the appearance of landing lights along a runway. As altitude changes occur in the simulated flight, an altitude computer (Fig. 8) varies the distance between these individual small light sources to project a changing pattern onto screen 14, whereby the proper visual cues are supplied to pilots seated within the cockpit enclosure 10. As heading changes occur, the entire light assembly of projector 17 is rotated about an axis normal to the plane of the light sources. Motions of the aircraft parallel to the ground are simulated by motion of the lights in their own plane and in a direction dependent upon the north-south and east-west components of the simulated aircraft motion, as related to the orientation of the runway strip.

Images of these runway light sources in projector 17 are projected through a projection lens assembly (23 in Fig. 2) which is adapted to accommodate a relatively wide angle of projection and which includes an anamorphic optical adapter. A similar anamorphic section is included in the projection lens assembly of projector 16 (as shown at 25 in Fig. 2). The anamorphic adapter sections in the optical systems of projectors 16 and 17 operate to correct length to width distortion, as fully disclosed in the aforesaid copending application.

In simulating an approach to a landing from a distance of several miles, only the simulated runway lights are initially projected, by projector 17. Since none of the runway terrain detail is visible from such a distance at night, projector 16 is rendered inoperative at this stage of the simulated approach. However, as the simulated flight approaches very near to the runway, projector 16 is gradually brought into operation and details of terrain gradually become visible to the pilot as he completes his simulated landing to touchdown, and as he appears to roll to a stop on the runway.

In the terrain projector 16, a photographic film transparency is employed as the image source. The appearance of changes in simulated altitude are effected by a variable magnification optical system, 126 in Fig. 6. Simulated flight motions are achieved in the optical system of projector 16 by similar means to those employed in projector 17, with heading changes being simulated by rotation of the film or transparency in its own plane, and with lateral and longitudinal motions being simulated by corresponding translation of the film in its own plane. Means suitable for producing these motions are disclosed in the aforesaid application and in Fig. 6 of the present application. As pointed out above, simulated roll and pitch motions may be obtained either by motion of the fuselage 10—12 or by appropriate motions of the optical projection apparatus 16, 14 and 17.

The apparatus of optical projectors 16 and 17 is operated by the output signals obtained from the simulator flight computers 200 (Fig. 8) and contains no "feedback" except through the manipulations of the pilot. Many different computers generally suitable for this purpose are known to the art. Some of the mathematical approximations heretofore commonly employed in flight simulators require modification for proper simulation of visual reference to the ground as provided by the apparatus of the invention. For example, many flight simulators heretofore have incorporated the effects of wind only during the time the simulated aircraft is airborne and in flight. In such prior art simulators, the aircraft has been considered to be operating in a "no-wind" condition during ground operations such as a take-off run or a landing run. Such systems as commonly used in instrument flight trainers, if used as the flight computers of the present invention will result in the wind velocity discontinuity appearing to the pilot as an abrupt change of aircraft velocity with respect to the ground images simulated by the apparatus of the invention. An improved flight simulator, embodying a combination of computers in which the effects of wind are continually introduced even when the simulated aircraft is on the ground, is fully disclosed in the copending application of Laurence E. Fogarty, Serial No. 477,741, filed December 27, 1954, and assigned to the same assignee of the present application. The computers disclosed in that application of Fogarty are ideally suited for use with the apparatus of the present invention.

Figure 2:
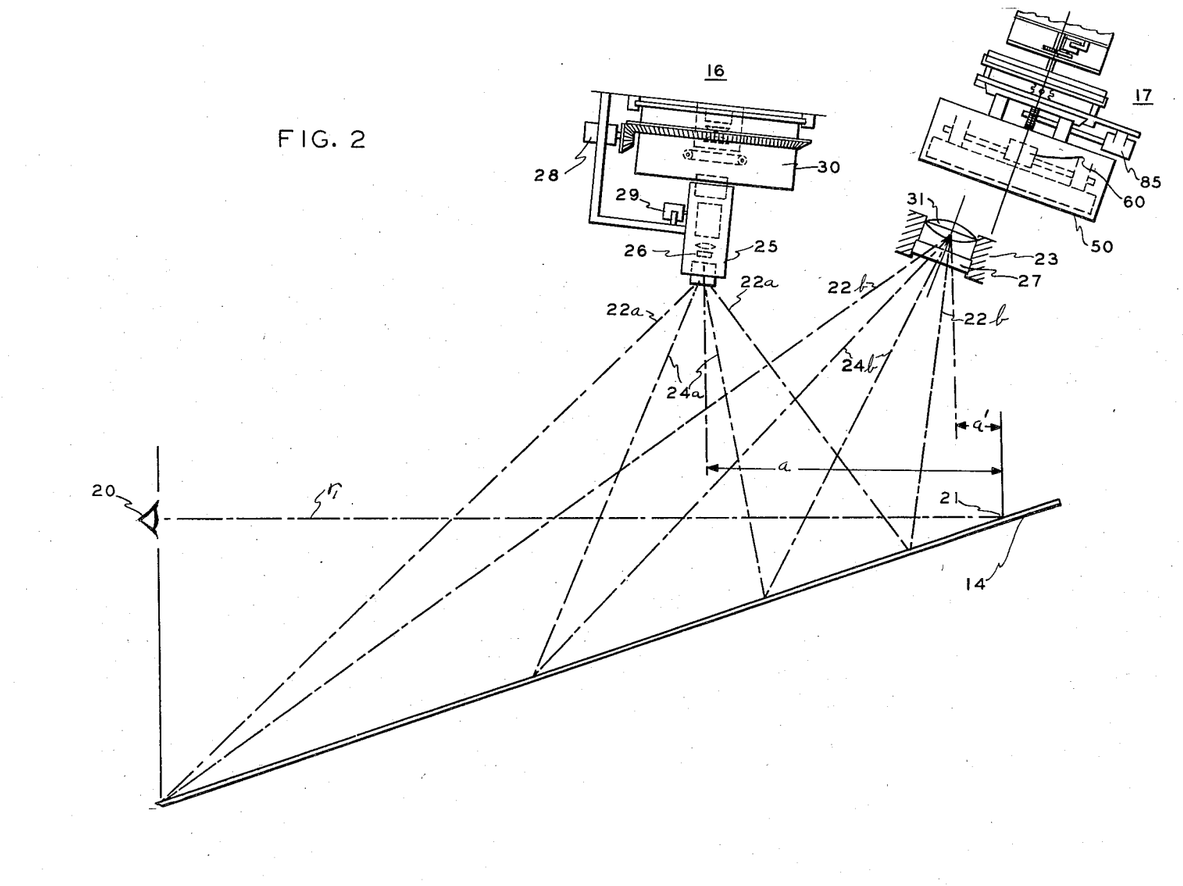
Fig. 2 represents a schematic diagram of the compensated offset optical system of the invention with the runway light and terrain projectors shown in greater detail.

Reference is now had to Fig. 2 of the drawings which illustrates schematically the optical system of the invention. The eye 20 represents the viewpoint of a trainee pilot seated within the cockpit enclosure (10 of Fig. 1). The point 21 on inclined screen 14 represents the location of the simulated horizon as viewed by the observer's eye 20. The broken lines 22a—22a represent the projection cone of terrain images from projector 16 when the simulated flight is at a very low altitude, close to the simulated runway, while the lines 24a—24a illustrate a smaller angle projection cone which may represent the same area of terrain as viewed by the eye 20 when the simulated flight is at a much greater altitude. Changes in terrain image size corresponding to the appearance of the ground from different altitudes are produced by operation of servomotor 29 to vary the magnification of the optical projection system 25, and changes in heading are simulated by operation of heading servomotor 28, which rotates the transparency carrier 30.

Broken lines 22b—22b emanating from the center of the optical lens system 23 of projector 17 represent the projection cone of runway light images onto screen 14 when a simulated flight is at a very low altitude, as in landing. The broken lines 24b—24b illustrate a narrower projection cone of runway light images as may be projected when the simulated flight is at a much higher altitude. The optical system 23 of projector 17, unlike the optical system 25 of projector 16, is of fixed magnification, and employs a very wide angle lens 31. Changes in size of runway light images, corresponding to changes in simulated altitude, are produced by operation of altitude servomotor 60 which operates to shift the runway light sources in projector 17 as will be described in greater detail hereinafter in reference to Fig. 3, Fig. 4, Fig. 5 and Fig. 7 of the drawings. Altitude servomotors 29 and 60, of projector 16 and 17 respectively, derive their operating signals from a common altitude servo M-302 (Fig. 8). Altitude motors 29 and 60 are preferably operated in unison, at least during the final approach of simulated let-down to a landing on the runway.

Coupled with the wide angle projection lens 31 of projector 17 is an anamorphic adapter section 27, while a similar anamorphic adapter section 26 is included in the variable magnification optical system 25 of projector 16. The function of these anamorphic adapters 26 and 27 is to eliminate length to width distortion of images projected onto the inclined screen 14, as explained fully in the aforesaid copending application of Hemstreet and Woodson. The angular magnification ratio of each of the anamorphic adapter sections 26 and 27 must be equal to the ratio of the distance between the viewpoint 20 and the horizon point 21 to the distance between the centers of the respective optical systems 25 and 23 to the same horizon point 21. Thus, if the horizontal distance represented by the line of sight from 20 to 21 be designated $r_1$, the distance from the center of optical system 25 to 21 be designated $a$ and the distance from the center of lens 31 to horizon 21 be designated as $a'$, the angular magnification of anamorphic element 26 should equal $r_1/a$, while the angular magnification of anamorphic element 27 should equal $r_1/a$. The mathematical derivation of these relationships, and the reasons therefor, are fully set forth in the aforesaid application of Hemstreet and Woodson.

Figure 7:
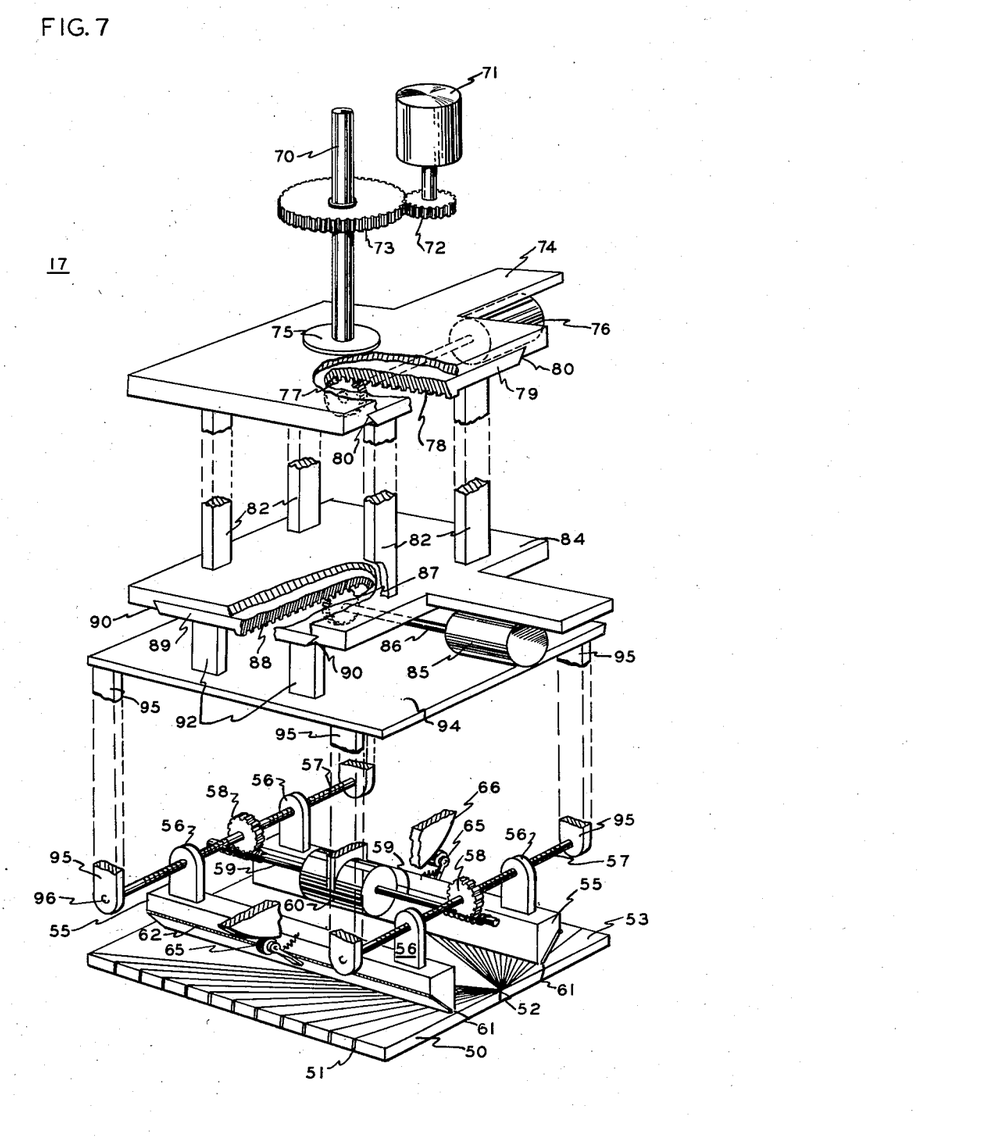
Fig. 7 represents an exploded perspective view of the runway light projector, with portions thereof cut away to reveal the cooperative relationship of various moving parts.
Figure 8:
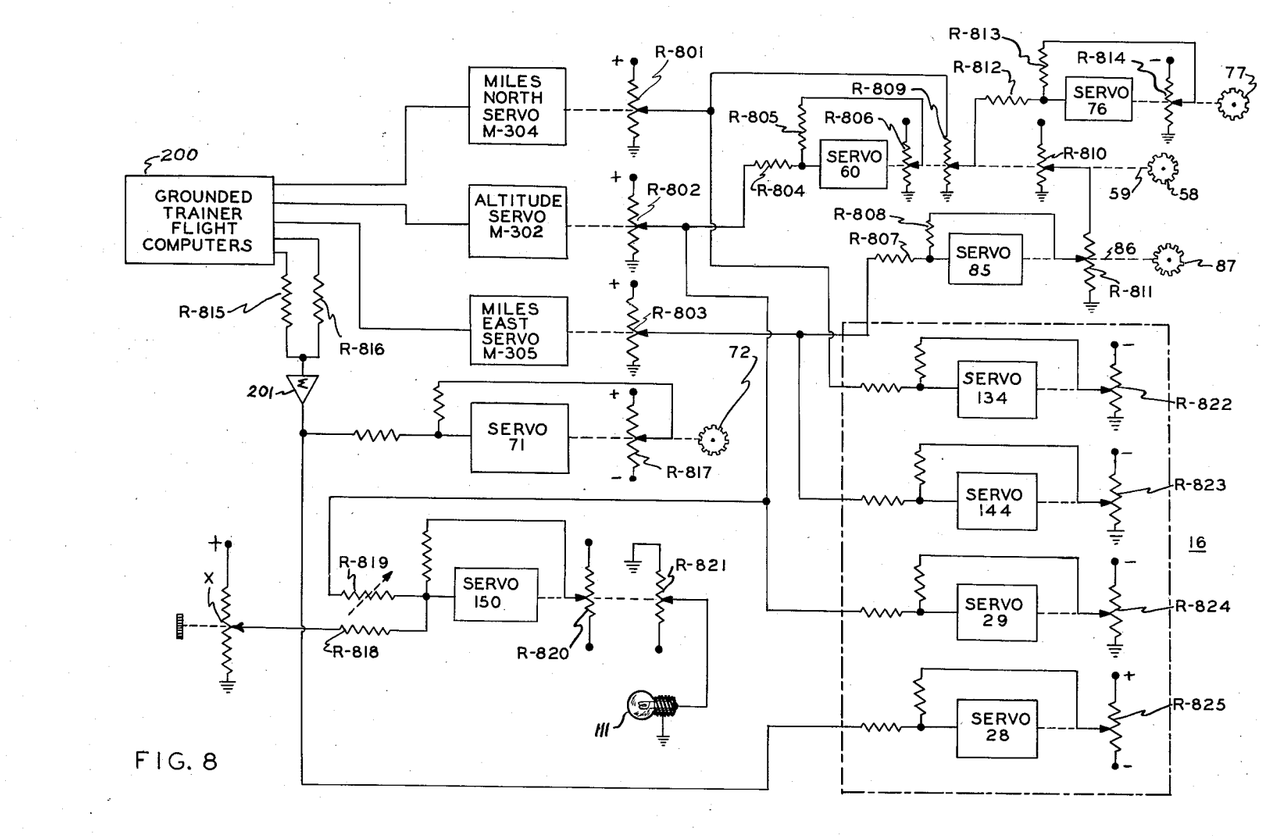
Fig. 8 is a schematic diagram of interconnections between the controls, computers and mechanical structures of the invention.

For a more complete understanding of the mechanism and operation of runway light projector 17, reference is now made to Fig. 7 of the drawings which represents an exploded perspective view of the apparatus with portions thereof cut away to reveal the cooperative relation between various of the moving parts. An opaque plate 50 is provided with a series of transparent slots 51 arranged in a fan-like pattern, all radiating from a common point 52 in one edge of the plate 50. Each of the slots 51 is gradually tapered so that it is wider at its outer extremity than at the common intersection point 52. The slots 51 may be formed by etching or engraving through an opaque coating on a transparent glass or plastic plate, or they may be formed from a solid plate of opaque material by suitable machine operations. The plurality of separate wedges, as 53, are mounted (by means shown in Fig. 3) in fixed relation to each other to maintain a constant radial pattern, as may be seen more clearly in the plan view of Fig. 5.

Returning to Fig. 7, the plurality of radial slots 51 in plate 50 cooperate with a pair of parallel light sources contained in housings 55—55 which are supported by four identical screw followers, designated 56, in engagement with a pair of lead screws 57—57. Centrally mounted on each of the lead screws 57—57, and affixed thereto, are worm gears 58 in engagement with a motor driven screw shaft 59. Reversible servomotor 60, which is driven by the output of altitude servo M–302 (Fig. 8), rotates shaft 59 in either one direction or the other depending upon direction of change of simulated altitude, and through the coupling of worms 58, lead screws 57 and screw followers 56, imparts lateral motion to the parallel light sources contained in housings 55—55 to vary the distance therebetween. The bottom portions of the light source housings 55—55 converge to form a pair of narrow slots 61—61. Enclosed within each of the light source housings 55—55 is a high intensity source of illumination, as for example a krypton discharge tube.

Figure 4:
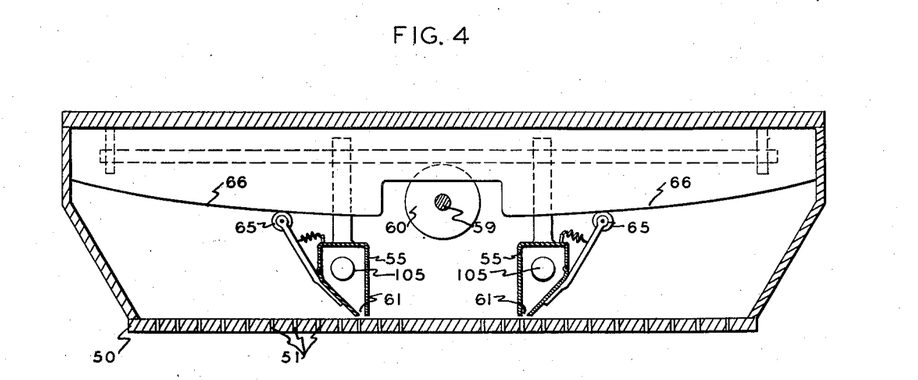
Fig. 4 represents a cross-sectional view of a portion of the apparatus taken along the line 4—4 of Fig. 3.
Figure 5:
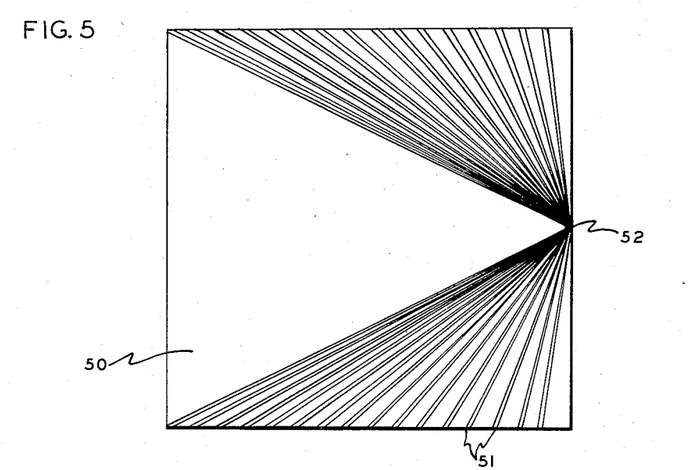
Fig. 5 represents a cross-sectional view of the runway light projector taken along the line 5—5 of Fig. 3.

One of the converging sides of each light source housing 55 is movable with respect to the other side, as represented by the hinge 62 in Fig. 7. A cam follower 65 is affixed to the movable portion of each light source housing and is held in engagement with a cam surface 66 by spring loaded means. The surface configuration of cam 66, as fully shown in Fig. 4, is such that the width of slots 61 increases directly as the distance between light source housings 55 increases. The intersections between the slots 61 in the light source housings and slots 51 in plate 50 form a series of small apertures arranged in parallel lines, through which the high intensity light from the enclosed illumination sources are projected by the optical system 23 (Fig. 2) to simulate the appearance of runway lights at an airfield. As the simulated aircraft altitude varies, the light source housings 55—55 are moved either closer together or farther apart. As the light source housings 55—55 move closer together, the several spots of light, which are projected to simulate the runway lights, move closer together and become somewhat smaller, thus simulating the appearance of an increase in altitude. Conversely, when the light source housings 55—55 are moved farther apart, the spacing between the individual light sources becomes greater, both laterally and longitudinally, and each light source spot becomes larger and brighter, thus simulating the appearance of a reduction in altitude.

The entire runway light projector apparatus of Fig. 7, including the base plate 50, is rotatably mounted on shaft 70 and adapted to be rotated in either direction by operation of reversible servomotor 71 which is coupled to shaft 70 through suitable gearing represented by spur gears 72 and 73. Motor 71 is driven by the output of summing amplifier 201 which is connected with a heading computer (200), as will be explained in reference to Fig. 8 hereinafter, so that rotation of the entire projector 17 through shaft 70 simulates changes in aircraft heading. Affixed to shaft 70, by means of flange 75, and carried thereby, is a platform 74 which supports another reversible servomotor 76, the shaft of which drives a pinion gear 77 in engagement with a rack 78 in a slidable bed 79. Bed 79 is slidably keyed to base 75 by means of parallel ways 80—80, whereby lateral motion may be imparted to bed 79 with respect to base 75 upon operation of motor 76 in either direction.

Rigid supporting means 82—82 connect slidable bed 79 with platform 84 in such manner that platform 84 is integral with bed 79 and moves laterally, in a plane parallel to platform 74, in response to operation of motor 76. Supported on platform 84 and carried thereby is another reversible servo motor 85, the rotatable shaft 86 of which is disposed at an angle of 90° to the axis of the rotation of motor 76. Pinion 87 on shaft 86 engages rack 88 of slidable bed 89. Bed 89 is slidably keyed to bed 84 by means of parallel ways 90—90, whereby bed 89 is adapted to move in a plane parallel to the plane of bed 79, along an axis at 90° to the axis of motion of bed 79, in response to operation of motor 85. By means of rigid supports 92—92, platform 94 is affixed to slidable bed 89 in a manner to move integral therewith. Further rigid supports 95 affixed to platform 94, and depending therefrom, support the lead screws 57—57 in four aligned journal bearings, designated 96, through the lower extremities of supports 95.

By this structure three degrees of motion may be imparted to the slotted plate 50, i. e., slotted plate 50 may be rotated on its own plane and translated in its own plane along either of two mutually perpendicular axes. It is to be understood that the axis of rotatable shaft 70 must be perpendicular to the plane of slotted base 50, and that the planes of the intermediate platforms 74, 84, and 94, and beds 79 and 89, are all parallel to the plane of slotted plate 50.

Motors 76 and 85 are coupled to the output circuits of lateral motion computers M–304 and M–305, respectively (Fig. 8), which compute the simulated flight motions along X and Y coordinate axes. Computers suitable for operating the servo motors of the invention, to accurately simulate the motions of flight, landing and take-off, are disclosed by the aforesaid application of Fogarty.

Figure 3:
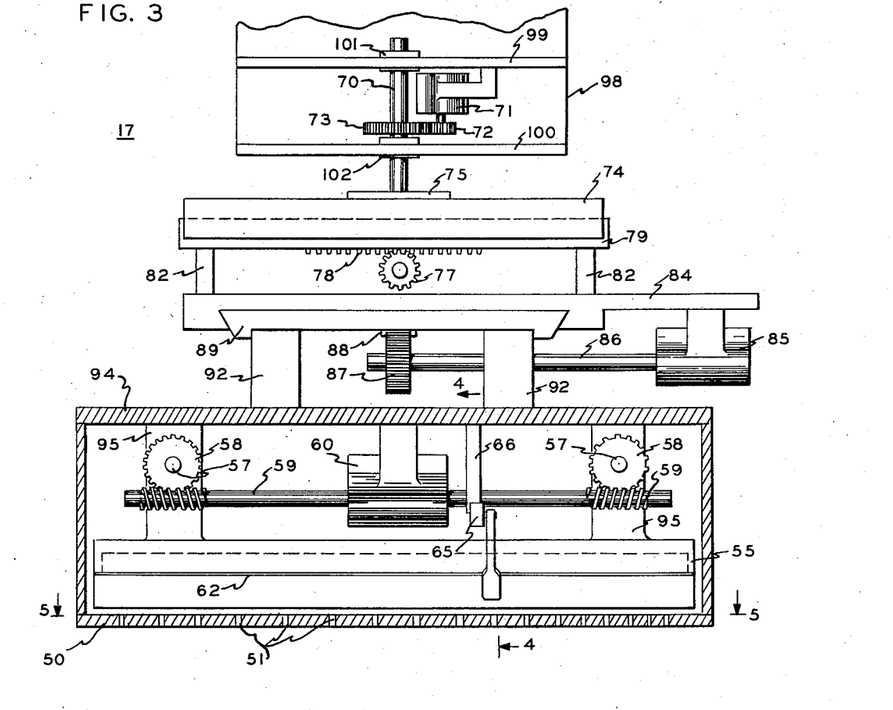
Fig. 3 represents a detailed cut-away view of the runway light projector shown generally in Fig. 1 and Fig. 2.

By reference to Fig. 3 and Fig. 4 of the drawings, which represent cross-sectional views of the assembled projector 17, the cooperative relation between the several parts shown in the exploded view of Fig. 7 may be better understood. In Fig. 3, the heading motor 71 and its associated drive gears 72 and 73 are illustrated as normally enclosed in a motor housing structure, designated generally as 98, which includes parallel top and bottom supporting plates 99 and 100 respectively. Rotatable heading shaft 70 is journaled through bearings 101 and 102, in plates 99 and 100 respectively. Flange 75, which is affixed to the lower end of shaft 70, external of housing 98, is also affixed to and integral with rotatable platform 74, whereby rotation may be imparted to the entire projector structure by operation of heading motor 71.

In the preferred embodiment of the invention, motor housing 98 is rigidly affixed to an overhead beam or ceiling structure and the simulation of roll and pitch motions in flight is produced by imparting such motions to the cockpit 10 (Fig. 1). One form of means for imparting such cockpit motions is disclosed in the aforesaid copending application of Hemstreet and Woodson. Improved means for moving the cockpit in simulation of pitch and roll motions are disclosed in the copending application of Walter R. Knapp, Serial No. 507,328 filed May 10, 1955, and assigned to the same assignee as the present invention. It is to be understood, however, that it is within the contemplation of the invention to impart roll and pitch motions to the optical projectors 16 and 17 and screen 14 by means (not shown) for tilting the axis of rotatable shaft 70 (Fig. 3 and Fig. 7) about either or both of two axes representing the roll and pitch axes of simulated flight.

The cross-sectional view of Fig. 4 taken along the line 4—4 of Fig. 3, discloses the shape of cam 66 and its cooperative relation to the pair of cam followers 65—65 by means of which the width of openings 61—61 in the pair of light source housings 55—55 may be varied as the light sources are moved by motor 60 in simulation of altitude changes. Also in Fig. 4, the pair of high intensity light sources 105—105 may be seen in cross-section within the enclosures of housings 55—55. Lamps 105—105 may be any suitable high intensity linear source of illumination, as for example krypton gas discharge tubes.

While the plurality of separate light apertures formed by the intersections between slots 61 and slots 51 are approximately in the shape of parallelograms, the size of these apertures is so small that when images thereof are projected through the wide angle optical system 23 (Fig. 2) the projected images appear on the screen 14 as bright points of light, appearing to trainees in the cockpit as runway lights along a simulated landing strip. It will be understood by those skilled in the art that different patterns, other than a pattern of runway lights, may be projected by similar means within the scope of the invention. For example, the appearance of an aircraft carrier deck and its landing markings may be projected in lieu of a pattern of airfield runway lights.

Figure 6:
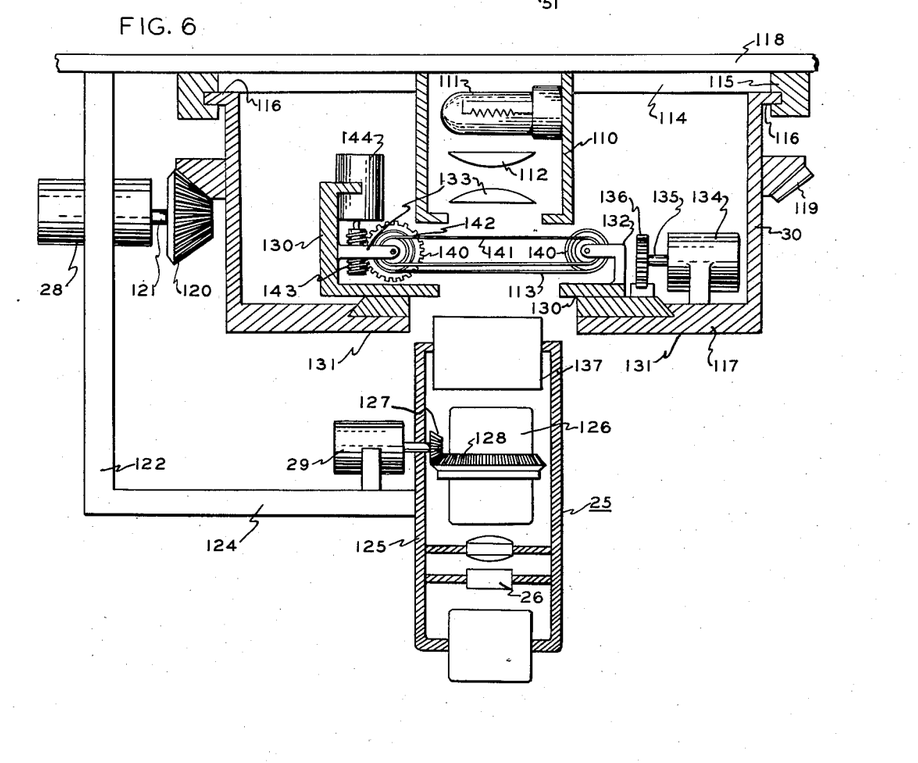
Fig. 6 represents a detailed cross-sectional view of the terrain projector illustrated generally in Fig. 1 and Fig. 2.

Reference is had to Fig. 6 of the drawings which discloses details of a preferred embodiment of the terrain projector 16. A vertically disposed lamp housing 110 contains a projection lamp 111 and a pair of condenser lenses 112 adapted to uniformly illuminate a substantially horizontally disposed transparency 113. Concentric with the vertical axis of lamp housing 110 is supporting ring 114 having an annular groove 115 within which flange 116 of cylindrical projector housing 30 is rotatably supported. Supporting ring 114 and lamp housing 110 are both rigidly affixed to top plate 118 by which the entire projector structure of Fig. 6 may be mounted on an overhead beam or ceiling structure. Surrounding the cylindrical projector housing 117 is an annular ring gear 119 which is engaged by bevel gear 120 affixed to the shaft 121 of reversible heading motor 28. Motor 28 is mounted on rigid arm 122 which is permanently affixed to top plate 118. Reversible motor 28 is operable by output signals from the summing amplifier 201 and heading computer (200) in Fig. 8. Operation of motor 28 in either direction rotates the cylindrical projector housing 117 about the vertical axis of concentric lamp housing 110.

The lower horizontally disposed portion 124 of depending arm 122 supports the lens tube 125 in coaxial alignment with rotatable cylinder 117 and lamp housing 110. Within the lens tube 125 are the various optical elements of the projection lens system 25, including an anamorphic adapter section 26 and a variable magnification lens system 126. Altitude servomotor 29 is also mounted on horizontal portion 124 of rigid arm 122 and carries a bevel gear 127 in engagement with ring gear 128 whereby the magnification of lens system 126 may be varied by operation of reversible motor 29 in either direction. Motor 29 is operated by the output signals from altitude servo M-302 (Fig. 8).

A transparency carriage 130 is slidably mounted by horizontal ways 131—131 within the base portion 117 of rotatable projector housing 30. Reversible servomotor 134, rigidly mounted to the base 117 of rotatable housing 30, carries on its rotatable shaft 135 a pinion gear 136 which engages rack 137 mounted on and integral with slidable transparency carriage 130. Operation of motor 134 in either direction shifts transparency carriage 130 laterally along an axis perpendicular to the plane of the drawing as shown in Fig. 6.

Transparency 113 is preferably a strip or roll of photographic film, the opposite ends of which are wound upon spools 140—140 which are rotatably supported about parallel axes through arms 132 and 133, mounted on carriage 130. Spools 140—140 are connected by belt drive 141 whereby they are adapted to be driven simultaneously in either direction to transport film from one spool to the other, according to the direction of spool rotation. Gear 142 affixed to the shaft of one spool 140 is engaged by worm gear 143 affixed to the shaft of reversible motor 144, whereby operation of motor 144 in either direction transfers film from one spool 140 to the other. Motors 134 and 144 are connected to the output circuits of lateral motion servos M-304 and M-305 (Fig. 8) whereby their operation effects lateral translation of film transparency 113, within its own plane, along X and Y coordinate axes according to simulated lateral motion of an aircraft in flight.

As fully disclosed in the aforesaid copending application of Hemstreet and Woodson, the principal plane of the projection lens 126 and the plane of the film transparency 113 must intersect in a common line in the plane of the projection screen 14 (Fig. 2) in order that the projected picture be in sharp focus over the entire screen. The same considerations apply to the positional alignment of projector 17 (Fig. 2), namely the plane of projection lens 31 and the plane of aperture plate 50 should also intersect in a common line in the plane of screen 14.

The corresponding altitude servomotors 29 and 60, of projectors 16 and 17 respectively, are preferably connected in parallel for simultaneous operation by the flight altitude computer, and similarly the respective heading motors 28 and 71 of projectors 16 and 17, and the corresponding lateral motion motors 134, 144 and 76, 85 should also be correspondingly connected for conjoint operation, as disclosed by the schematic diagram of Fig. 8.

Shown in Fig. 8 in electrical schematic form is an exemplary manner in which the invention may be connected to a conventional electronic grounded trainer for use in conjunction therewith. Modern grounded trainers are commonly provided with velocity servomotors such as M-304 and M-305 which receive potentials from the trainer flight computer and integrate such potentials to provide shaft outputs for tracing the ground track of simulated flight on a map or aeronautical chart. Such trainers are also provided with an altitude servo such as M-302 which provides an output shaft position commensurate with the instantaneous altitude of simulated flight. As mentioned above some modern trainers are somewhat unsuitable in conjunction with visual display apparatus because the effect of wind is not properly simulated, but the proper simulation of wind may be effected by using the system of the above mentioned Fogarty application. The ground position and altitude servos shown in Fig. 8 are given numbers corresponding to the numbers utilized for corresponding parts in the above mentioned Fogarty application. Heading servo 71 of the instant invention may be positioned by applying flight path azimuth angle $\psi_p$ and sideslip angle $\beta$ potentials from the Fogarty flight computers (200) through summing resistors R-815 and R-816 and summing amplifier 201 to provide a heading potential. Servo 71 is provided with a conventional follow-up or rebalancing potentiometer R-817 and drives gear 72 as shown in Fig. 7.

As light sources 55 of Fig. 7 are driven to and from each other by servomotor 60 in response to altitude changes, the scale factor of the display presented by projector 17 must be changed—or in other words, the amount which servos 76 and 85 must shift projector 17 for given amounts of "north-south" or "east-west" travel depends upon the instantaneous altitude of the simulated aircraft. For this reason, servos 76 and 85 are positioned by potentials which are inverse functions of altitude as well as direct functions of ground position. Two alternative ways in which proper positioning of servos 76 and 85 may be accomplished are shown in Fig. 8. Servo 76 is positioned in accordance with a potential applied via summing resistor R-812. This potential is derived in accordance with Y ground position (miles north) by means of potentiometer R-801 and modified in accordance with altitude by means of potentiometer R-809, the arm of which is positioned in accordance with the reciprocal of altitude by servo 60. At greater altitudes potentiometer R-809 applies a lesser portion of the potential from R-801 to servo 76, resulting in a lesser translation of projector 17 for a given change in ground position of the simulated aircraft. Servo 60 is positioned in accordance with the reciprocal of altitude by applying a potential proportional to altitude from potentiometer R-802, the arm of which may be positioned by the conventional grounded trainer altitude servo M-302. Servo 60 is provided with a conventional hyperbolic follow-up potentiometer R-806, so that the servo rotates to a position such that its output shaft position is a measure of the reciprocal of altitude.

Alternatively, follow-up potentiometer R-806 may comprise a linear potentiometer so that servo 60 is positioned directly proportional to altitude and the inverse function operation of the projector servos may be obtained by exciting their follow-up potentiometers with a potential commensurate with altitude, such as shown for servo 85 in Fig. 8. Servo 85 will rotate until the potential applied via resistor R-807 is cancelled by the rebalancing potential derived from follow-up potentiometer R-811, at which time the position of shaft 86 will be proportional to X or "east" ground position modified by the required inverse function of altitude. It is to be understood that in actual embodiments of the invention servos 76 and 85 preferably would both utilize the same system. If servo 60 is positioned directly proportional to altitude, the conventional altitude servo of the grounded trainer may be used for servo 60, though the fact that such servo is usually required to drive a large number of potentiometers for flight computing makes it desirable that a separate motor be provided to position the light sources.

Also shown in Fig. 8 are four servos 134, 144, 29 and 28 used to operate terrain projector 16. Servos 134 and 144, which determine the lateral position simulated by the terrain projector, may be seen to be connected to the same terminals and hence responsive to the same potentials as the lateral position servos 76 and 85 of runway lights projector 17; altitude servo 29 of terrain projector 16 is responsive to the trainer altitude servo M-302, being connected to potentiometer R-802 in parallel with runway lights projector altitude servo 60, and terrain projector heading servo 28 is connected to the same heading potential as runway lights projector heading servo 71.

Shown in Fig. 8 is a manually operable potentiometer X having its winding excited by a constant potential from the conventional grounded trainer computer power supply, so that an adjustable constant potential is applied to the input circuit of terrain projector intensity servo 150. Also applied to the input circuit of servo 150 via resistance R-819 is a potential commensurate with altitude derived from potentiometer R-802. At altitudes above where terrain is visible the two input signals applied to projection intensity servo 150 combine and hold servo 150 at one of its mechanical limits of rotation, so that the arm of variable resistance R-821 is positioned upwardly at or near its grounded terminal and little or no voltage is applied to projection lamp 111 of terrain projector 16. As simulated altitude decreases the resultant voltage input applied to servo 150 from summing resistors R-818 and R-819 becomes less positive due to decrease in the voltage from potentiometer R-802, and at a particular simulated altitude servo 150 leaves its mechanical limit and begins to drive the arm of resistance R-821 downwardly, applying increasing current to projection lamp 111 as simulated altitude further decreases. It will be seen that by varying the setting of manual potentiometer X the altitude at which the projection lamp 111 begins to illuminate may be varied. Summing resistance R-819 may be made variable as indicated by the dashed arrow, and by changing the setting of resistance R-819 the rate at which illumination varies with change in altitude may be varied. It will be apparent to those skilled in the art that the rate of change of illumination also may be made non-linear if desired by provision of a non-linear follow-up potentiometer R-820 on the projection intensity servo 150.

In Fig. 8 the servos shown in block diagram form may comprise conventional grounded trainer servomechanisms, and it will be apparent that either alternating or direct current operation may be utilized. It will also be apparent to those skilled in the art that buffer amplifiers and polarity inversion amplifiers (not shown) would ordinarily be utilized in constructing the invention in accordance with Fig. 8.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a grounded aviation trainer, image forming means for producing a variable visual display simulating the appearance of parallel rows of ground lights as viewed from an aircraft executing landing and take-off maneuvers therebetween comprising, a plurality of discrete light sources arranged in parallel rows, means for varying the distance between said rows, means for varying the size and spacing between discrete light sources of each row as the distance between said rows is varied to simulate changes in altitude of flight above said simulated ground lights, reversible means for rotating said parallel rows of discrete light sources about an axis normal to the plane of said rows to simulate changes in aircraft heading, and reversible means for moving said parallel rows of discrete light sources in lateral translation within their own plane to simulate lateral motions of flight.

2. Image forming means in an optical projector for producing visual displays with a grounded aviation trainer comprising, a plurality of transparent apertures radiating from a common point of intersection in an otherwise substantially opaque plate, means for producing a pair of parallel high intensity line sources of illumination in a plane adjacent to the plane of said apertures and equidistant from said common intersection point, and means for varying the distance between said parallel illumination sources.

3. Image forming means in a visual display aviation trainer comprising in combination, an image aperture plate having a plurality of tapered transparent apertures radiating substantially in a plane from a common intersection point, a pair of substantially linear sources of illumination mounted for movement in a plane adjacent and parallel to the plane of said apertures, means for maintaining said linear sources equidistant from said common intersection point, and motor means for varying the distance between said linear sources.

4. Means for forming a plurality of discrete images of point light sources arranged in parallel rows corresponding to airport runway lights comprising, a plurality of tapered transparent apertures radiating in a plane from a common intersection point in an otherwise substantially opaque plate, a pair of elongated lamp housings each enclosing a substantially linear source of illumination, an elongated linear aperture in each of said housings, means supporting said housings in parallel relationship with said linear apertures disposed in a plane adjacent and parallel to the plane of said tapered apertures, said supporting means positioning corresponding portions of said lamp housings equidistant from said common intersection point, and reversible motor drive means for varying the distance between said parallel lamp housings while maintaining said equidistant relation to said common point.

5. The combination of claim 4 including means for varying the width of said apertures in said lamp housings in direct proportion to the distance between said lamp housings.

6. The combination of claim 4 including reversible motor means for imparting rotational and translational motion to said aperture plate within the principal plane of said plate.

7. Means for creating the illusion of night flight within visual contact of a pair of parallel rows of ground lights comprising, a pair of elongated parallel lamp housings each enclosing a substantially linear source of illumination, an elongated linear aperture in each of said housings, movable mounting means supporting said lamp housings with said elongated apertures in a common plane, first reversible motor means operable upon said movable mounting means to vary the distance between said parallel lamp housings, a plurality of transparent radial apertures in an otherwise substantially opaque plate disposed in a plane adjacent and parallel to the plane of said lamp housing apertures, said radial apertures converging to a common intersection point at one edge of said plate adjacent corresponding ends of said lamp housings and midway between said housings, said radial apertures fanning outwardly in opposite directions from said common point, all of said radial apertures being uniformly tapered from said point to uniformly greater widths at their outer extremities, cam operated means on said lamp housings for varying the width of said linear apertures in direct relation to the distance between said lamp housings, common support means for said radial aperture plate and said movable lamp housing means, second reversible motor means for moving said common support in lateral translation, third reversible motor means for moving said common support laterally along an axis at ninety degrees to the translational axis of said second motor means, and a fourth reversible motor means for rotating said common support about an axis normal to the plane of said radial aperture plate.

8. In a grounded aviation trainer, an optical image projector comprising a source of illumination in axial alignment with a variable magnification projection lens system, a transparency film support disposed between the said illumination source and said projection lens, said support comprising a pair of parallel spools adapted to receive a film transparency wound thereon, a flexible belt drive connecting said spools, first reversible motor drive means geared to one of said spools whereby both of said spools may be simultaneously rotated in either direction to transport film from one spool to the other depending upon the direction of rotation of said first reversible motor, a rotatable cylinder mounted substantially coaxial with said illumination source and adapted to be rotated thereabout, second reversible motor means geared to said rotatable cylinder for imparting rotation thereto, parallel ways in the base of said cylinder for guiding said film support, third reversible motor means mounted on said cylinder and geared to said film support for imparting lateral motion to said support within said cylinder in a direction parallel to the axes of said film transport spools, and fourth reversible motor means geared to said variable magnification projection lens for varying the magnification thereof according to the direction of rotation of said motor means.

References Cited in the file of this patent

UNITED STATES PATENTS

| | | |
|---|---|---|
| 1,829,634 | Chretien | Oct. 27, 1931 |
| 1,916,567 | Grant | July 4, 1933 |
| 2,352,101 | Hutter | June 20, 1944 |
| 2,381,757 | Jones | Aug. 7, 1945 |
| 2,385,095 | McCarthy | Sept. 18, 1945 |
| 2,420,316 | Hine | May 13, 1947 |
| 2,518,419 | Dehmel | Aug. 8, 1950 |
| 2,711,593 | Lewis et al. | June 28, 1955 |

FOREIGN PATENTS

| | | |
|---|---|---|
| 622,312 | Great Britain | Apr. 29, 1949 |
| 640,045 | Great Britain | July 12, 1950 |